United States Patent [19]

Sword

[11] Patent Number: 4,653,792
[45] Date of Patent: Mar. 31, 1987

[54] LINE COUPLING APPARATUS

[76] Inventor: Alexander F. Sword, Anderson Park, P.O. Box 27, Vernonia, Oreg. 97064

[21] Appl. No.: 255,716

[22] Filed: Apr. 20, 1981

[51] Int. Cl.$^4$ ............................................... B66C 1/14
[52] U.S. Cl. ..................................... 294/82.14; 294/74
[58] Field of Search ............ 294/78 R, 74; 24/115 R, 24/117, 119, 128, 129 R, 129 A; 403/353, 209, 301, 305

[56] References Cited

U.S. PATENT DOCUMENTS 1,381,616  6/1921  Clausen et al. ........................ 294/78
1,720,069  7/1920  Yeaton ................................. 294/74

FOREIGN PATENT DOCUMENTS 770347  10/1967  Canada ............................. 294/78 R Primary Examiner—James B. Marbert
Attorney, Agent, or Firm—Kolisch, Hartwell & Dickinson

[57] ABSTRACT

Apparatus for coupling a choker line which terminates at a nubbin to a main line in a log-hauling system. The apparatus includes an elongate body having an axially extending chamber of a size enabling confined axial movement of the choker nubbin therein. The choker nubbin and adjacent portion of choker line are receivable in the chamber by passage, in a direction substantially normal to the choker line axis, through an elongate keyhole slot formed in the body and extending to the lower end thereof. A shackle mounted on the upper end of the body for swinging toward and away from a position of axial alignment with the body fastens the body to the main line. A plate formed with the shackle acts to block passage of the choker nubbin through the keyhole slot at all shackle positions except a preselected one which is remote from the aligned position.

7 Claims, 6 Drawing Figures

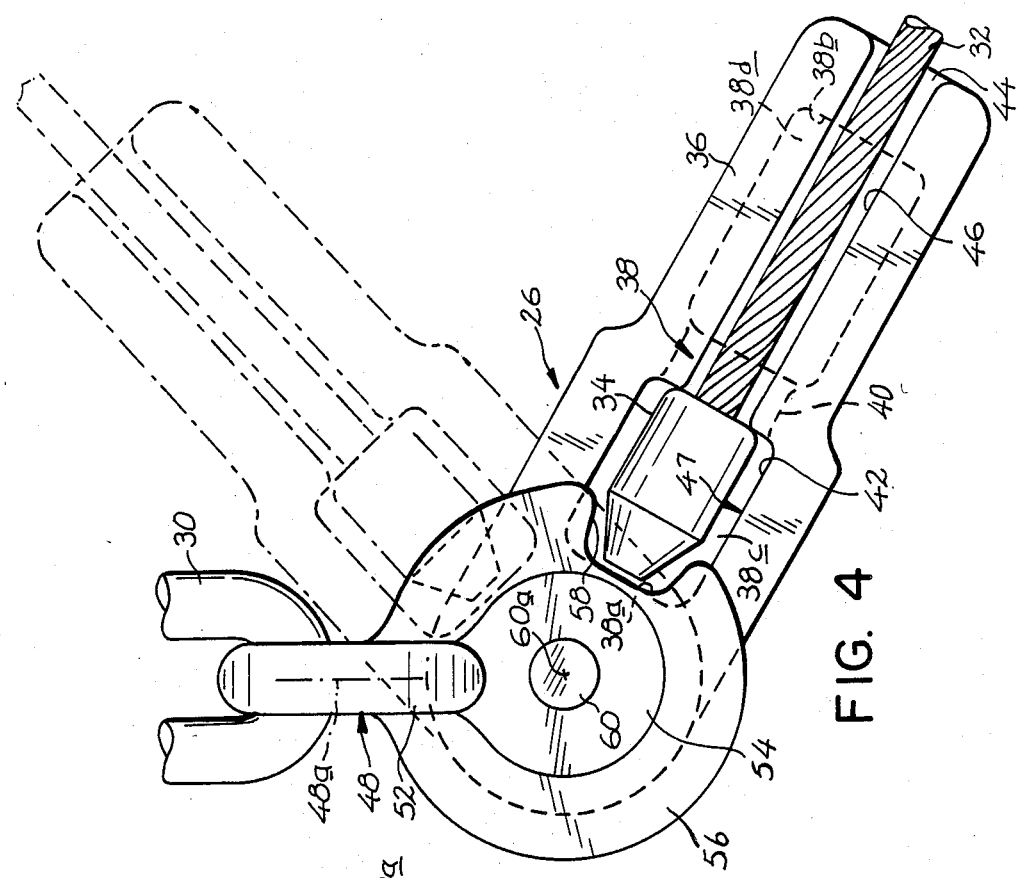
FIG. 4
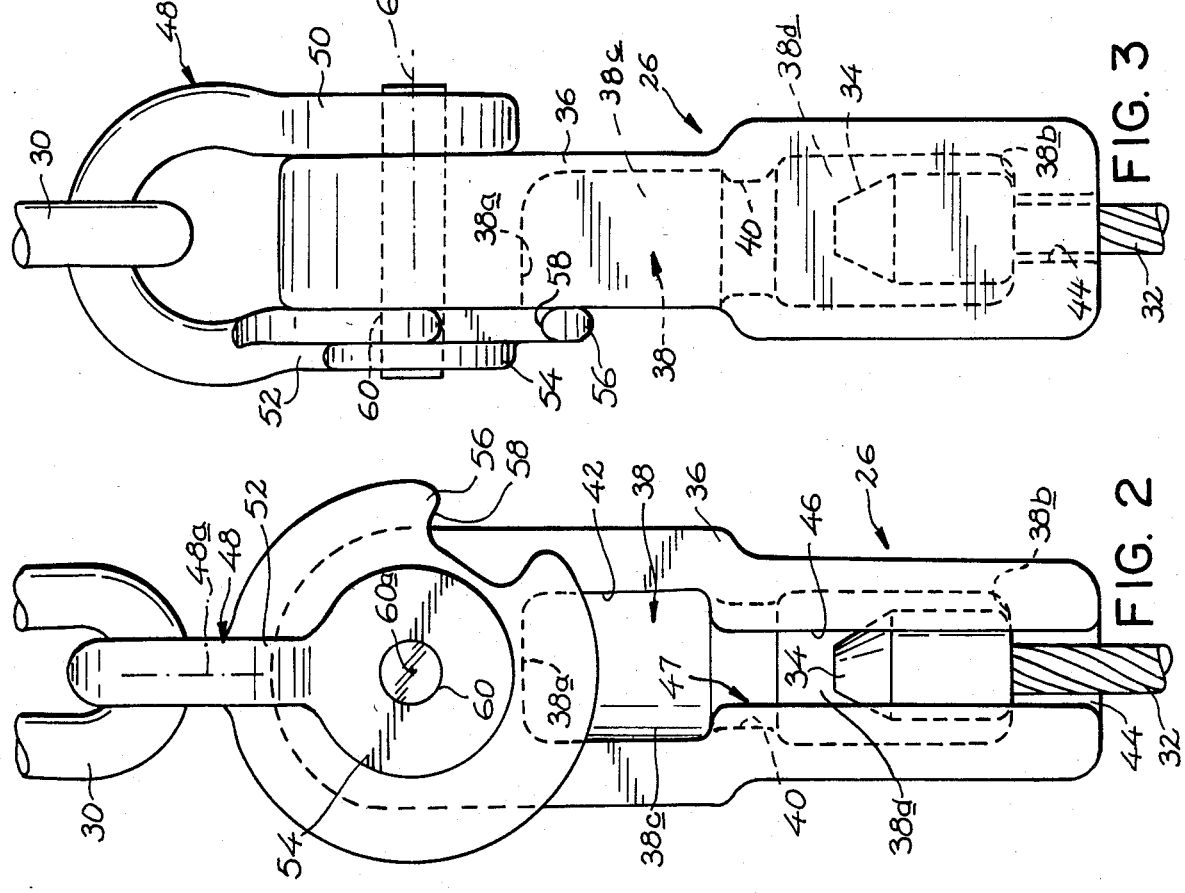
FIG. 3
FIG. 2

LINE COUPLING APPARATUS

BACKGROUND AND SUMMARY

The present invention relates to line coupling apparatus in a log-hauling system, and particularly, to apparatus which is commonly referred to as a butt hook and which forms part of the rigging in a high-lead log-hauling system.

The usual high-lead log-hauling system employs a main line and a haulback line which are joined to form a line loop extending between a tower and a remote pulley station The two lines in the loop are joined by a butt rigging assembly having generally one or more butt chains, each of which is equipped with a butt lock at its free end. A choker line terminating at a nubbin, or ferrule, is releasably coupled to the line loop by releasable attachment of the line nubbin to a butt lock in the butt rigging assembly. The position of the assembly between the tower and the pulley station is controlled by a yarder located near the tower.

The usual type of butt lock known in the prior art includes an elongate body provided with an upper opening and a lower nubbin seat The upper opening is of a size enabling passage of the choker nubbin and attached line therethrough, in a line-axial direction substantially normal to the body axis. The nubbin is placed in a seated position by pulling the choker line in a generally downwardly direction through a lower opening in the lock. Likewise, the line is released from the lock by feeding the line upwardly through the lower opening in the lock, to unseat the nubbin, then drawing the line, again in a direction substantially normal to the body axis, through the upper opening in the lock in a line-axial direction.

A characteristic feature of prior art butt locks of the type described above is that the choker line nubbin is captured in the lock only when the choker line is under tension. When the line is slack, as during a log loading or unloading operation, line coiling may cause the line to be fed upwardly through the lock's lower opening, thereby unseating the nubbin, and placing the line in a "pre-release" position. When tension is reapplied to the choker line, the line may be pulled through the lock's upper opening, detaching the line from the lock, or the line may be kinked as the nubbin is pulled into the nubbin seat. In addition to these problems, the free end portion of the choker line, which is fed through the lock's lower opening when the line is slack, tends to become snagged on vegetation, and may also present a safety hazard.

A general object of the present invention is to provide, for use as a butt lock in a log-hauling system, a line coupling apparatus which substantially overcomes above-mentioned problems associated with butt locks known in the prior art.

A more particular obJect of the invention is to provide such an apparatus which functions to prevent a choker line nubbin, once attached to the apparatus, from becoming released inadvertently when the choker line is slack.

Another object of the invention is to provide such apparatus in which nubbin release requires initial axial movement toward a release position placement of a swingable shackle in the apparatus to a selected angular position, and withdrawal of the nubbin in a direction substantially normal to the choker line axis.

The apparatus of the present invention includes an elongate body having an axially extending chamber of a size enabling axial movement of a choker nubbin therein between upper and lower positions through a constriction of substantially clearance fit. The choker nubbin and adjacent portions of choker line are receivable in the chamber by passage, in a direction substantially normal to the choker line axis, through an elongate keyhole slot formed in the body. The apparatus is linked in a butt chain by a shackle which is mounted on the upper body end for swinging toward and away from a position of axial alignment with the body. A plate formed on the shackle acts to block passage of the choker through the keyhole slot at all shackle positions except a preselected one which is remote from the aligned position.

In a preferred embodiment of the invention, the shackle swings about an axis which substantially parallels the direction of movement of the choker line and nubbin through the keyhole slot. The shackle plate has a notch which is alignable with the slot at a position intermediate its aligned position and an extreme pivoted shackle position.

These and other objects and features of the present invention will become more fully apparent when the following detailed description of preferred embodiments of the invention is read in conjunction with the accompanying drawings.

DESCRIPTION OF THE DRAWINGS

FIG. 2 is an enlarged front view of the apparatus of the invention, taken generally in the region indicated by line 2—2 in FIG. 1;

FIG. 3 is a side view of the apparatus shown in FIG. 2, as seen from the right in that figure;

FIG. 4 is a view similar to FIG. 2, but showing the apparatus in solid lines at its release position, and in dash-dot lines, at a fully pivoted position;

DETAILED DESCRIPTION OF THE INVENTION

Figure 1:
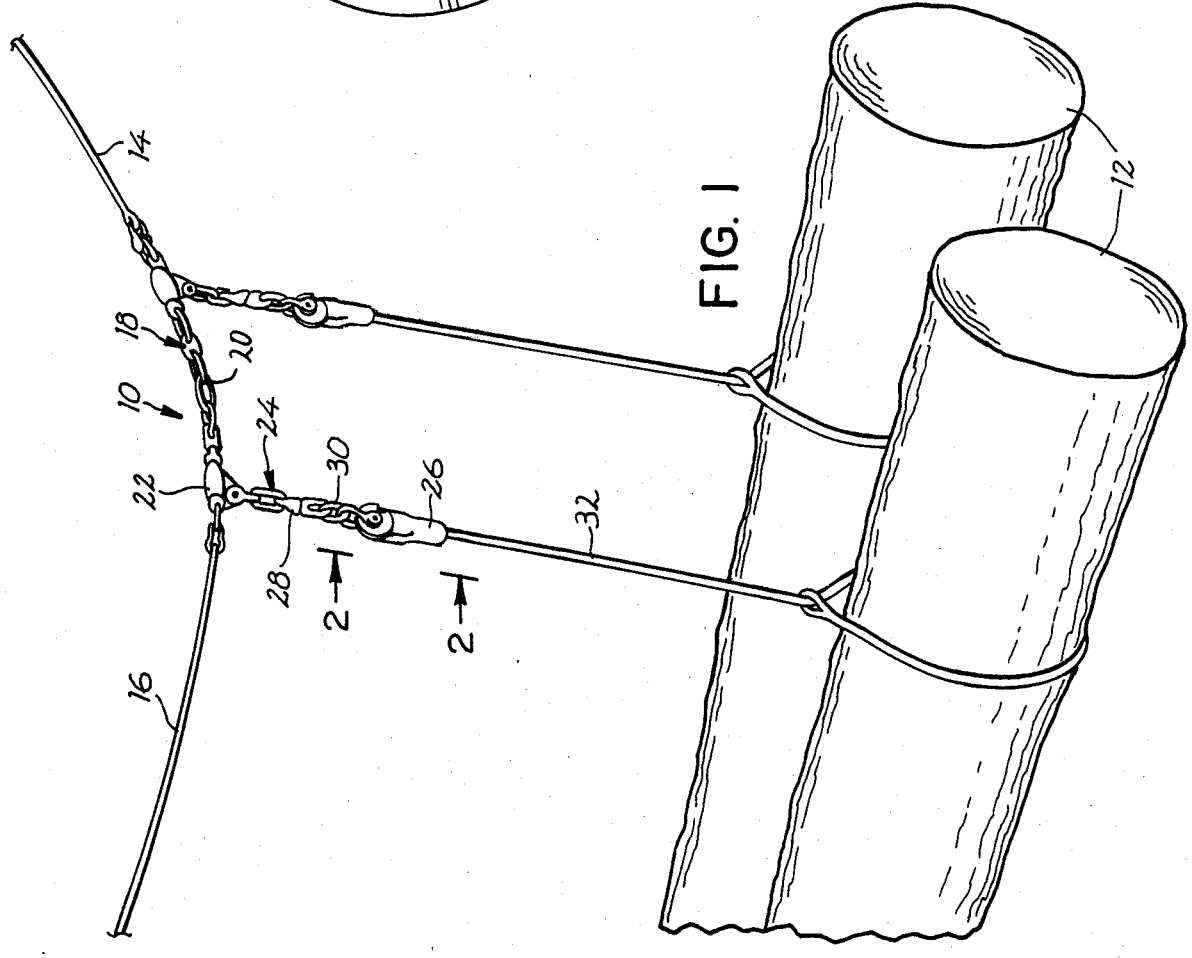
FIG. 1 is a fragmentary perspective view of a high-lead log-hauling system employing apparatus constructed according to the present invention.

FIG. 1 shows a fragmentary portion of a line loop 10 in a log-hauling system used in transporting logs, such as logs 12, from a cutting site to a loading site. A main hauling line 14 in loop 10 is joined to a haulback line 16 in the loop by a chain assembly 18 described below. The position of assembly 18 is controlled conventionally by a yarder (not shown) located near the loading site.

Assembly 18 is composed of a line chain 20 having a pair of swivel links, such as link 22, used in connecting a pair of butt chains, such as chain 24, in the assembly swivelably and pivotally on chain 20. Chain 24, which is representative, includes at its lower end in FIG. 1, a line-coupling apparatus, or butt lock 26 constructed according to the present invention and described in detail below. Apparatus 26 is linked to a swivel 28 in the butt chain by a link 30. Apparatus 26 is used in releasably coupling a conventional choker line 32 to the line loop. Line 32 terminates at its free end in a conventional nubbin, or ferrule, 34 seen in FIGS. 2–4.

Apparatus 26 will now be described with reference to FIGS. 2–4. An elongate body 36 in the apparatus has an enlarged upper portion when viewed from the front, as in FIGS. 2 and 4, and an enlarged lower portion when viewed from the side, as in FIG. 3. The body defines an elongate internal chamber 38 extending axially between upper and lower ends 38a, 38b, respectively. An annular constriction 40 in the chamber partitions the same into upper and lower regions 38c, 38d, respectively. Constriction 40 is dimensioned to enable substantially clearance-fit passage of a nubbin, such as nubbin 34 therethrough as the nubbin is moved axially from a seated position (FIGS. 2 and 3) in region 38d toward a release position (FIG. 4) in region 38c.

As seen best in FIGS. 2 and 4, there is formed in the upper portion of body 36 an upper opening 42 communicating chamber 38, and more particularly, region 38c thereof, with the exterior of the body. The opening is of a size enabling passage of a nubbin, such as nubbin 34, into and out of the chamber in a direction normal to the plane of the two figures.

Formed in the lower end of body 36 is a lower opening 44 communicating the lower end of the body with the chamber's lower end 38b, and dimensioned for passage of line 32 therethrough. An elongate slot 46 formed in wall structure in the body between openings 42, 44 is dimensioned for passage of line 32 therethrough. Opening 42 and slot 46 form what is referred to herebelow as a keyhole slot 47 in the body of the apparatus. The dimensions of slot 47 are such that nubbin 34 is captured in chamber 38 in all but its release position (shown in FIG. 4).

A shackle 48 in the apparatus is used in linking body 36 to link 30 in the butt chain (FIG. 1). The shackle, which has the generally inverted U-shape seen in FIG. 3, includes a pair of downwardly extending arms 50, 52 which terminate at rounded flared ends, such as end 54 in arm 52. A circular plate 56 having a notch 58 formed in its outer edge region is formed with the shackle on shackle arm 52, adjacent and concentric with arm end 54, as shown. The plate functions in a manner which will become clear below.

Shackle 48 is mounted on body 36 by a pin 60 received rotatably through an opening in the upper portion of the body and rigidly secured, at its opposite ends, in openings formed in the ends of arms 50, 52. The shackle is thus mounted on the body for swinging about an axis 60a toward and away from the position of longitudinal alignment with body 36 shown in FIGS. 2 and 3. The extent of shackle swinging, in either a clockwise or counterclockwise direction, is limited by contact between body 36 and link 30, as shown in dash-dot lines in FIG. 4. The apparatus is held in its aligned position during normal operation by tension in the choker line and tends to swing to one of its fully pivoted positions when the choker line is slack and somewhat coiled.

Referring to FIG. 4, swinging of shackle 48 about 60° away from its aligned position toward the fully pivoted position shown in the figure places the shackle notch in registry with opening 42, to place the apparatus in a release position. It is contemplated that the apparatus be constructed such that the release position occurs at a preferred body/shackle angle between about 45° and 90° away from the aligned position toward the fully pivoted position shown in FIG. 4.

In operation, to attach line 32 to apparatus 26, the choker line and apparatus are placed in the positions shown in solid lines in FIG. 4, wherein the choker line can be moved into chamber 38 by passage in a direction normal to the line through the keyhole slot in the apparatus. The apparatus and choker line are then moved, either manually, or under the force of gravity, or by the application of tension in the choker line, through clearance fit constriction 40, to their positions shown in FIGS. 2 and 3, where the apparatus is in its aligned position and the choker nubbin is in its seated position in chamber region 38d.

To uncouple the line from the apparatus, the line is moved manually upwardly in chamber 38, through the clearance-fit constriction 40 in the chamber to the position shown in FIG. 4. The apparatus is then swung 60° to it release position (FIG. 4) and held there manually while the choker line and nubbin are lifted out of chamber 38. It will be seen below how the three-step manipulation required to release the choker line from the apparatus prevents inadvertent nubbin escape under conditions where the choker line is slack.

Figure 6:
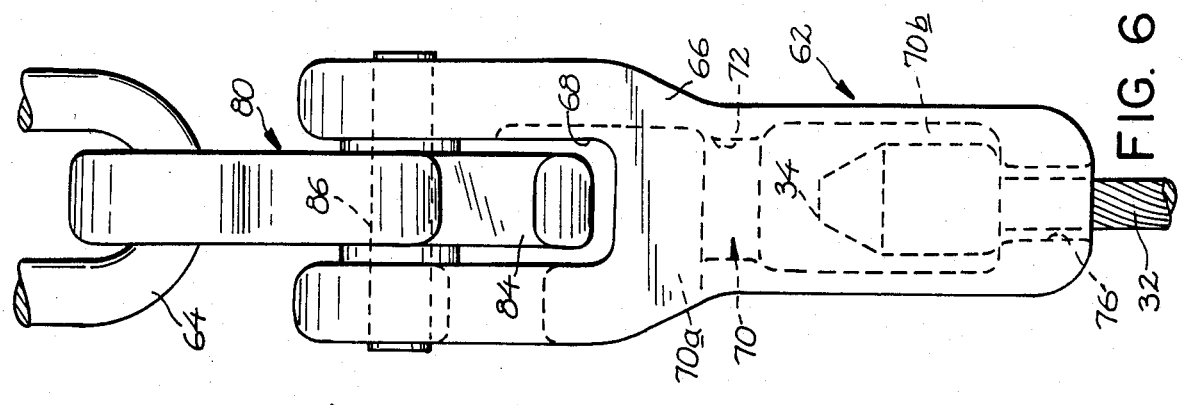
FIG. 6 is a side view of the apparatus shown in FIG. 5.
Figure 5:
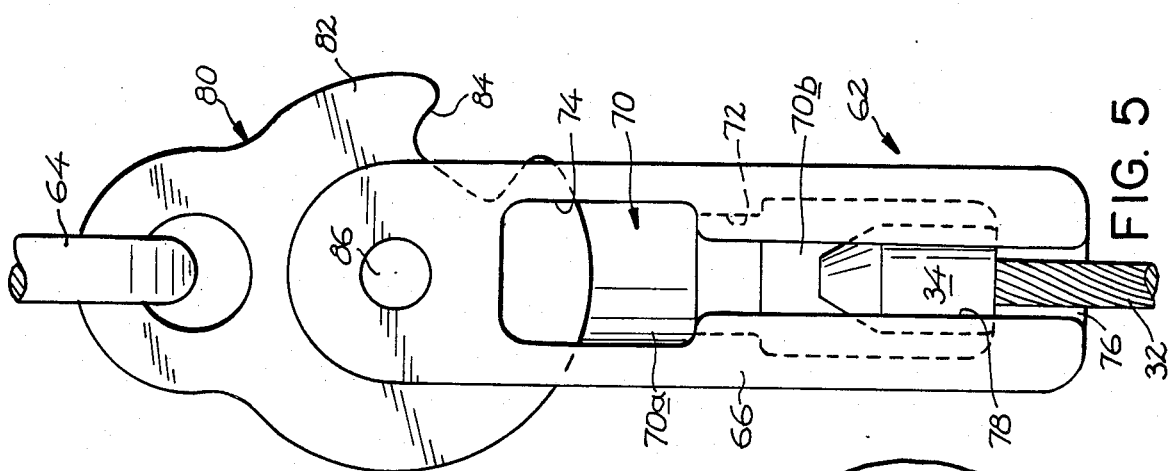
FIG. 5 is a front view of apparatus constructed according to a second embodiment of the present invention.

Apparatus constructed according to a second embodiment of the invention is shown at 62 in FIGS. 5 and 6. The apparatus functions in a butt line, such as that described above with reference to apparatus 26, for coupling a choker cable 32 terminating at a nubbin 34 to the butt line. A link 64 in the butt line corresponds to link 30 in FIGS. 2–4.

A body 66 in the apparatus has a bifurcated upper end defining an elongate cavity 68 having the rectangular cross section seen in FIG. 6. Formed in body 66 is an elongate chamber 70 having upper and lower chamber regions 70a, 70b, respectively, partitioned by an annular constriction 72. The axial and radial dimensions of the chamber including constriction 72 therein, are substantially identical to those of chamber 38 described above with reference to apparatus 26.

Chamber 70 is accessed by an elongate keyhole slot composed of an upper opening 74, a lower opening 76 and an elongate slot 78 (like previously mentioned slot 46) extending therebetween. The keyhole slot in apparatus 62 has dimensions similar to that in apparatus 26, providing choker line access to and from chamber 70 when the choker line is positioned for passage of nubbin 34 transversely through opening 74.

A shackle 80 having the generally figure-eight shape seen in FIG. 5 has an enlarged lower end portion 82 with a notch 84 formed therein. The shackle is mounted on the upper end of body 66 by a pin 86 for swinging thereon about the pin's axis. The shackle is free to swing between the axially aligned position shown in the figures in either direction toward a fully pivoted position where the upper end of the shackle is denied entry into cavity 68. The fully pivoted positions occur, as in apparatus 26, when the choker line is in a slack, somewhat coiled condition.

The apparatus is placed in a release position by rotating the shackle about 60° in a clockwise direction in FIG. 5, to align notch 84 with opening 74. As in apparatus 26, the release position is intermediate the aligned and fully pivoted positions in the apparatus. The steps involved in attaching a choker line to, or detaching a choker line from, the apparatus are substantially identical to those described with respect to apparatus 26, with the exception that in apparatus 62, the apparatus must be placed first in a release position before the choker line nubbin can be moved fully upwardly in chamber 70 to a position allowing passage of the nubbin through opening 74.

Features of the invention which function to prevent unintended escape of the choker nubbin from the apparatus of the invention will now be considered with particular reference to apparatus 26 (illustrated in FIGS. 2-4). As noted above, nubbin release requires initial axial movement of the nubbin into upper chamber region 38c, swinging of the apparatus to its release position, and while the apparatus is held in the release position, movement of the nubbin in a direction substantially normal to the choker line through passage 42. Axial movement of the choker line toward its release position is retarded by constriction 40, particularly where the force acting on the line has a nonaxial component. Swinging in the apparatus, in response to line coiling, tends to occur in continuous movements between the aligned and fully pivoted positions. As the apparatus pivots between these positions, the registry between notch 58 and opening 42 required for nubbin release occurs only instantaneously preventing opportunity for nubbin passage through the opening. Such passage is particularly unlikely because it must occur in a direction normal to the usual axial forces in the line. Thus, the nubbin remains captured in chamber 38, whether the choker line is under tension or slack and coiled.

While preferred embodiments of the invention have been described herein, it is apparent that various changes and modifications can be made without departing from the spirit of the invention.

It is claimed and desired to secure by Letters Patent:

1. In a log-hauling system including a main line and a choker line which terminates at a nubbin, apparatus carried on said main line releasably attaching the choker line thereto, comprising
   an elongate body having an axially extending chamber formed therein including upper and lower regions joined through a constriction enabling confined axial movement of said choker nubbin in the chamber between an upper position in said upper region and a lower, seated position in said lower region, with the nubbin, when shifting in the chamber between the two regions, passing substantially with a clearance fit through said constriction,
   a lower opening formed in said body communicating with said lower region, through which said choker line passes,
   an upper opening formed in said body, adjacent its upper end, communicating with said upper region, and enabling passage of said nubbin freely thereinto,
   a slot formed in said body, extending between said upper and lower openings and of a size enabling passge of said choker line into said chamber and said lower opening,
   a shackle having an upper end joined to said main line and a lower end mounted on the upper end of said body for swinging thereon toward and away from a position of axial alignment with said body, and
   means on said shackle for blocking passage of said choker nubbin through said upper opening, to confine said nubbin within said chamber, when said shackle is disposed in such aligned position, and providing for passage of said nubbin through said opening when said shackle is disposed at a preselected position substantially removed from the aligned position.

2. The apparatus of claim 1, wherein said upper opening is of a size enabling passage of said nubbin therethrough in a direction substantially normal to the choker line's axis, with the shackle at its preselected position.

3. The apparatus of claim 2, wherein said shackle swings on said body about an axis substantially paralleling the direction of nubbin movement through said upper opening.

4. The apparatus of claim 1, wherein said shackle is swingable between such an aligned position and a slack position where the shackle makes an acute angle with respect to said body, and said preselected position is intermediate said aligned and slack positions.

5. The apparatus of claim 1, wherein said slot is defined by elongate wall structure having a length exceeding the length of the nubbin.

6. Coupling apparatus for use in coupling a choker which terminates at a nubbin releasably to a main line in a log-hauling system, said apparatus comprising
   an elongate body having an axially extending chamber formed therein, including upper and lower regions joined through a constriction adapted for confined axial movement of the nubbin in said upper region and a lower, seated position in said lower region, with the nubbin, when shifted in the chamber between the two regions, passing substantially with a clearance fit through said constriction,
   a lower opening formed in said body communicating with said lower region, of a size adapted for passage of the choker line therethrough,
   an upper opening formed in said body, adjacent its upper end, communicating with said upper region, and adapted for passage of the choker nubbin freely therethrough,
   an elongate slot formed in said body, extending between said upper and lower openings, adapted for enabling passage of the choker line into said chamber and said lower opening,
   a shackle having an upper end adapted for attachment to the main line, and a lower end mounted or the upper end of said body for swinging thereon between a position where the shackle is substantially aligned with said body, and a slack position where the shackle is angled with respect to the body, and
   means on said shackle for covering a portion of said upper opening, adapted to prevent passage of such a nubbin therethrough to confine the nubbin within said chamber, when said shackle is moved away from a preselected position intermediate said aligned and slack positions, said covering means being adapted to allow passage of such a nubbin through said upper opening at said preselected position.

7. The apparatus of claim 6, wherein said slot is defined by elongate wall structure having a length exceeding the length of the nubbin.